United States Patent
Krishnamachar et al.

(10) Patent No.: US 12,008,482 B2
(45) Date of Patent: Jun. 11, 2024

(54) SYSTEMS AND METHODS FOR PREDICTIVE DRAWBRIDGE OPERATION FOR VEHICLE NAVIGATION

(71) Applicant: Ford Global Technologies, LLC, Dearborn, MI (US)

(72) Inventors: Anjali Krishnamachar, Menlo Park, CA (US); Matthew A. Warner, Saline, MI (US); Umair Ibrahim, San Jose, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 835 days.

(21) Appl. No.: 17/135,140

(22) Filed: Dec. 28, 2020

(65) Prior Publication Data

US 2022/0207387 A1    Jun. 30, 2022

(51) Int. Cl.
*G06N 5/04* (2023.01)
*G06N 5/02* (2023.01)

(52) U.S. Cl.
CPC ............... *G06N 5/04* (2013.01); *G06N 5/02* (2013.01)

(58) Field of Classification Search
CPC .................................. G06N 5/04; G06N 5/02
See application file for complete search history.

(56) References Cited

U.S. PATENT DOCUMENTS

| | | | | |
|---|---|---|---|---|
| 6,185,504 B1 * | 2/2001 | Berstis | .................. | B61L 25/025 340/436 |
| 2009/0063045 A1 * | 3/2009 | Figueroa | ................ | G01C 21/26 701/414 |
| 2012/0078506 A1 * | 3/2012 | Husain | ............. | G08G 1/096844 701/414 |
| 2014/0257693 A1 | 9/2014 | Ehlers | | |
| 2016/0076899 A1 | 3/2016 | MacNeille et al. | | |
| 2017/0161003 A1 * | 6/2017 | Burris | ..................... | H04W 4/12 |
| 2018/0335781 A1 | 11/2018 | Chase et al. | | |
| 2019/0293437 A1 * | 9/2019 | Szubbocsev | ............ | G06F 16/29 |

FOREIGN PATENT DOCUMENTS

DE    102019217763 A1 *    5/2020    ............. G08G 1/052

OTHER PUBLICATIONS

Jane MacFarlane, "Your Navigation App Is Making Traffic Unmanageable", IEEE Spectrum, IEEE Spectrum.org, Sep. 19, 2019, 7 pages.

* cited by examiner

*Primary Examiner* — David E Choi
(74) *Attorney, Agent, or Firm* — Emily Drake; Eversheds Sutherland (US) LLP

(57) ABSTRACT

Systems and methods are provided for predicting drawbridge operation based on incoming vessel information and historical drawbridge operation data, and transmitting the drawbridge operation prediction to a GPS system such as an autonomous vehicle or a mobile device application for rerouting a planned navigation route. A transceiver may receive vessel information, e.g., incoming vessel size, type, speed, position, or quantity, or estimated incoming vessel arrival time, from one or more cameras and/or a marine radio, and may receive historical drawbridge operation data based on the incoming vessel information from an online database such that the drawbridge operation prediction is based on the historical data.

20 Claims, 3 Drawing Sheets

SYSTEMS AND METHODS FOR PREDICTIVE DRAWBRIDGE OPERATION FOR VEHICLE NAVIGATION

FIELD OF USE

The present disclosure is directed to systems and methods for predicting drawbridge operation for routing and/or rerouting a navigation route.

BACKGROUND

Cities that are located on the water often have drawbridges built into their road networks. These drawbridges allow vehicle traffic to flow over them; however, they also may open, which allows water traffic (e.g., commercial vessels and pleasure boats) to sail from one side to the other. The opening of drawbridges in high density traffic areas is a common source of congestion and transportation delays. During these times, vehicles are halted and unable to cross over the drawbridge until the drawbridge re-closes.

In some cities, a schedule exists for the planned drawbridge opening/closing times; however, the actual operation of the drawbridge often deviates from the planned schedule based on the amount of boat traffic present, weather, and other factors. One such factor is that different types of boats have different drawbridge-opening protocols. For example, a commercial boat might cross at a scheduled time, whereas a pleasure boat might instead phone the bridge operator to open the bridge at a time different from the planned schedule. This issue of unpredictable opening times affects route planning and traffic as it is difficult to predict when the drawbridge will open as well as the duration of the resulting delay. As a result, cities that contain drawbridges have the problem of traffic congestion and unpredictable delays along a vehicle's planned navigation route due to potential drawbridge openings.

The existing solution is a warning sign with a light that blinks, which is initiated when the drawbridge is about to open. The warning sign is typically located on the road leading to the drawbridge and does not notify the driver ahead of time to reroute and avoid the delay. In addition, these warning signs may easily be missed.

Current techniques are limited either to available scheduled drawbridge opening times or data indicative of a drawbridge opening in real-time, and do not disclose a prediction model used to predict the opening time/duration based on incoming vessel information received via, e.g., camera feeds, marine radio monitoring, a history of drawbridge opening times, etc.

In view of the foregoing drawbacks of previously known systems and methods, there exists a need for reliable data regarding drawbridge operation for initial routing and rerouting planned navigation routes to reduce traffic congestion and unpredictable delays along the planned navigation route.

DETAILED DESCRIPTION

Overview

Figure 1:
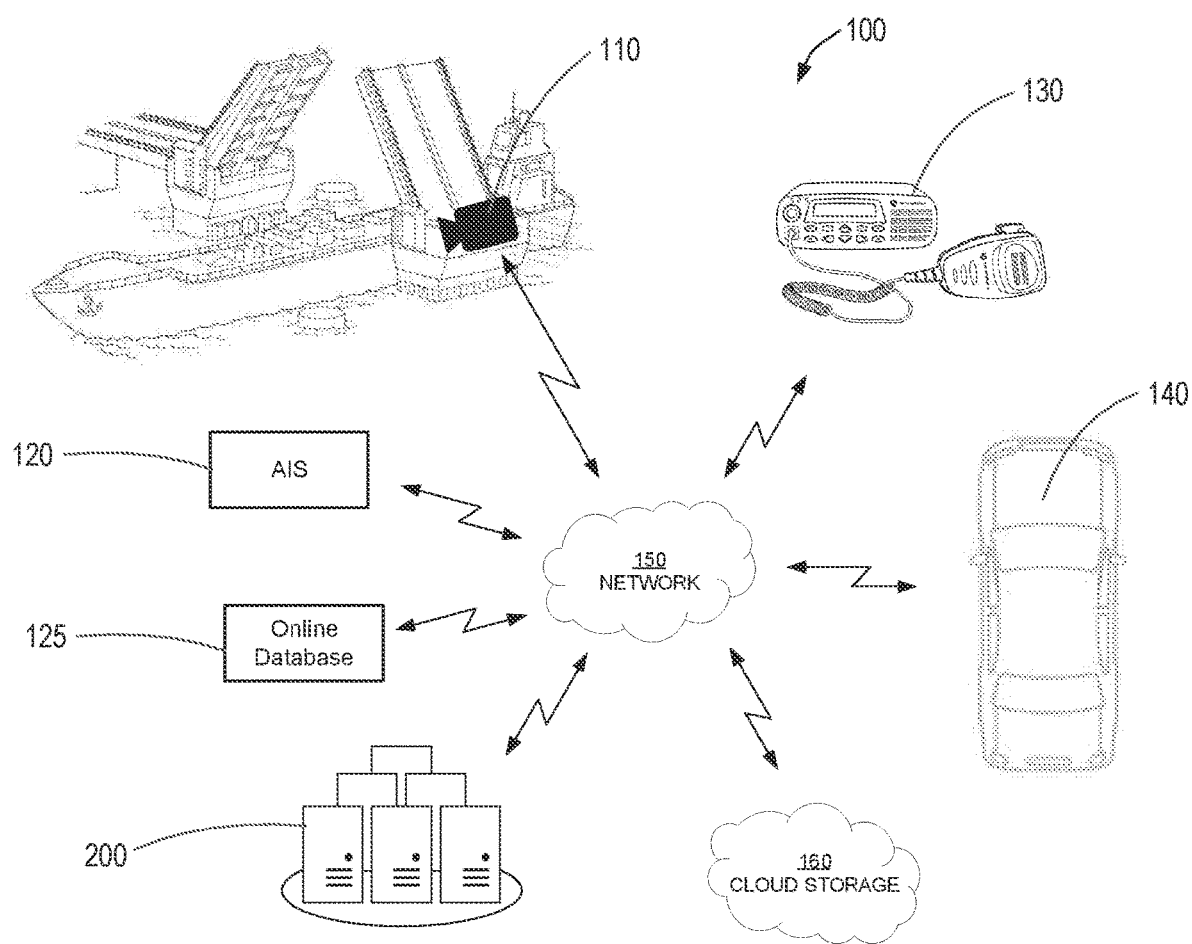
FIG. 1 illustrates a system for predicting drawbridge operation in accordance with the principles of the present invention.

A smart drawbridge system that is capable of communicating opening time, duration, and uncertainty information to vehicles in the vicinity, e.g., autonomous vehicles, so that the vehicles may use this information for route planning and re-routing is disclosed. The smart drawbridge system may include a drawbridge operation prediction model that uses a combination of cameras and/or other sensing devices, e.g., LIDAR, RADAR, Infra-red etc., (to identify water vessel size and quantity to determine estimated speed and time to travel across the drawbridge), marine radio monitoring, a schedule of operation, an aggregated history of drawbridge operating times based on parameters such as average delay due to the bridge opening), etc. The prediction model may be used to predict the opening time, duration, closing time, and uncertainty information provided to the vehicles.

The present disclosure overcomes the drawbacks of previously-known systems and methods by providing for predicting drawbridge operation. For example, the system may include a transceiver receiving data indicative of incoming vessel information, e.g., incoming vessel size, incoming vessel type, incoming vessel speed, incoming vessel position and heading, or incoming vessel quantity. In addition, the system may include a memory that stores computer-executable instructions, and a processor that may access the memory and execute the computer-executable instructions to: receive historical drawbridge operation data based on the incoming vessel information, and to predict drawbridge operation information based on the historical data. For example, the historical drawbridge operation data may include average delay due to drawbridge operation, deviation from drawbridge operation schedule, and/or deviation from arrival and departure of vessel. The processor may receive historical drawbridge operation data based on the incoming vessel information from an online database. Certain parameters such as likely bridge opening time, earliest bridge opening time, confidence, etc. may be calculated based on the historical data and used in dissemination to the interested system modules.

The transceiver may receive image data indicative of incoming vessel information from one or more cameras that capture and transmit image data indicative of incoming vessel information. Accordingly, the processor may extrapolate incoming vessel information from the image data. The cameras may be disposed in a vicinity of a drawbridge. The transceiver further may receive audio data indicative of incoming vessel information from a marine radio. For example, the audio data may be a request for drawbridge operation, e.g., estimated incoming vessel arrival time, incoming vessel size, incoming vessel type, incoming vessel speed, incoming vessel position. Accordingly, the processor may transcribe the audio data to extrapolate incoming vessel information from the audio data.

Moreover, the processor may further receive drawbridge operation schedule information from an Automatic Information System (AIS). Accordingly, the processor may predict drawbridge operation information based in part on the drawbridge operation schedule information. The processor may transmit data indicative of the predicted drawbridge operation information to a GPS system. The GPS system may reroute a planned navigation route based on the predicted drawbridge operation information. The GPS system may be integrated in an autonomous vehicle or a mobile device application. In addition, the GPS system may be within a predetermined geofence. In one embodiment, the processor further may generate one or more routing suggestions based on the predicted drawbridge operation information, and transmit the one or more routing suggestions to the GPS system. For example, the one or more routing suggestions may be a suggested delayed departure time.

In accordance with another aspect of the present invention, a method for predicting drawbridge operation is provided. For example, the method may include receiving, by the transceiver, data indicative of incoming vessel information; receiving, by the processor, historical drawbridge operation data based on the incoming vessel information; and predicting, by the processor, drawbridge operation information based on the historical data. The method further may include transmitting, by the transceiver, data indicative of the predicted drawbridge operation information to a GPS system, thereby causing the GPS system to route a planned navigation, e.g., reroute a planned navigation route.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art.

Referring now to FIG. 1, predictive drawbridge operation system 100 is described. System 100 may include one or more sensing devices, e.g., cameras 110 or other sensing devices such as LIDAR, RADAR, Infra-red etc., Automatic Information System (AIS) 120, online database 125, and/or marine radio 130, all communicatively coupled to predictive drawbridge operation platform 200 via, e.g., network 150. Predictive drawbridge operation platform 200 may be located on one or more servers, and communicate with GPS system 140 via network 150 as described in further detail below.

One or more cameras 110 may be disposed in the vicinity of a drawbridge such that they are able to perceive and capture incoming vessels approaching the drawbridge along the water route. For example, cameras 110 may capture images and/or video of incoming vessels from which vessel information, e.g., incoming vessel size, incoming vessel type (commercial vessel or pleasure boat), incoming vessel speed, incoming vessel position, and/or incoming vessel quantity, may be derived. The vessel information may be indicative of when the drawbridge will open and how long the drawbridge will remain open for the vessel(s) to cross the drawbridge before the drawbridge may close again. For example, larger vessels will take longer to cross than smaller vessels, and multiple vessels will take longer to cross than a single vessel. Moreover, the speed of a vessel may indicate when the vessel will approach the drawbridge, and thus the time the drawbridge will open. In addition, as a commercial boat may cross the drawbridge at a scheduled time, whereas a pleasure boat may need to phone the bridge operator to open the bridge at a time different from the planned schedule, this vessel information may inform predictive drawbridge operation platform 200 to inquire further information from, e.g., the available drawbridge operation schedule and/or a marine radio.

AIS 120 is an online publishing of commercial vessels and broadcasts over marine frequency (available at: https://www.navcen.uscg.gov/?pageName=AISmain). AIS 120 may provide information that may be utilized as an input for identifying incoming commercial boat traffic before the boats are in view of the perception system, e.g., cameras 110. The information from AIS 120 may be used as an input to determine a time estimate of the bridge opening.

Online database 125 may be any online database providing historical drawbridge operation data for a given vessel. For example, the historical drawbridge operation data may include the average delay due to drawbridge operation for a given vessel, deviation from drawbridge operation schedule for the given vessel, and/or deviation from arrival and departure of the given vessel. The historical drawbridge operation data may be used by predictive drawbridge operation platform 200 to predict the drawbridge opening time and duration for a given incoming vessel based on patterns and historical data regarding that specific vessel. For example, online database 125 may provide information that a large commercial boat generally requires the drawbridge to be opened for ten minutes, and this data may be shared with predictive drawbridge operation platform 200, e.g., via network 150. Other drawbridges in the vicinity also may communicate the downstream/upstream direction of the oncoming vessel traffic to predictive drawbridge operation platform 200 via network 150, and cameras 110 may confirm.

Marine radio 130 may be any radio providing a live radio feed used by an incoming vessel for communication information such as requests for drawbridge opening and other vessel information described above. The audio feed may be listened to or otherwise received by predictive drawbridge operation platform 200 to detect when an incoming vessel communicates with the drawbridge operator a request passage across the drawbridge. Based on this information, predictive drawbridge operation platform 200 may request further information, e.g., from online database 125 regarding the nature and duration of drawbridge opening schedule in real time.

GPS system 140 is used to plan a navigation route and may be integrated in a vehicle. The vehicle may be a manually driven vehicle (e.g., no autonomy) and/or configured and/or programmed to operate in a fully autonomous (e.g., driverless) mode (e.g., Level-5 autonomy) or in one or more partial autonomy modes which may include driver assist technologies. Examples of partial autonomy (or driver assist) modes are widely understood in the art as autonomy Levels 1 through 4. A vehicle having a Level-0 autonomous automation may not include autonomous driving features. An autonomous vehicle (AV) having Level-1 autonomy may include a single automated driver assistance feature, such as steering or acceleration assistance. Adaptive cruise control is one such example of a Level-1 autonomous system that includes aspects of both acceleration and steering. Level-2 autonomy in vehicles may provide partial automation of steering and acceleration functionality, where the automated system(s) are supervised by a human driver that performs non-automated operations such as braking and other controls. In some aspects, with Level-2 autonomous features and greater, a primary user may control the vehicle while the user is inside of the vehicle, or in some example embodiments, from a location remote from the vehicle but within a control zone extending up to several meters from the vehicle while it is in remote operation. Level-3 autonomy in a vehicle can provide conditional automation and control of driving features. For example, Level-3 vehicle autonomy typically includes "environmental detection" capabilities, where the vehicle can make informed decisions independently from a present driver, such as accelerating past a slow-moving vehicle, while the present driver remains ready to retake control of the vehicle if the system is unable to execute the task. Level-4 autonomous vehicles can operate independently from a human driver, but may still include human controls for override operation. Level-4 automation may also enable a self-driving mode to intervene responsive to a predefined conditional trigger, such as a road hazard or a system failure. Level-5 autonomy is associated with autonomous vehicle systems that require no human input for operation, and generally do not include human operational driving controls. According to embodiments of the present disclosure, predictive drawbridge operation platform 200 may be configured and/or programmed to operate with a vehicle having a Level-4 or Level-5 autonomous vehicle controller.

Additionally or alternatively, GPS system 140 may be embedded in a GPS navigation software application downloadable on, e.g., a smart mobile phone, such as Google Maps, Waze, Apple Maps, etc. GPS system 140 may communicate with predictive drawbridge operation platform 200 to receive predicted drawbridge operation data, such that GPS system 140 may generate a revised route (re-route) for the planned navigation to improve navigation efficiency and reduce travel time required to complete the navigation route, e.g., by suggesting alternative route options. Any changes in route may then be incorporated into assessment of charging status and requirements to optimize the autonomous vehicle's power efficiency. In addition, based on the predicted drawbridge operation data, GPS system 140 may suggest to the user a delayed departure time if it improves overall navigation efficiency.

Network 150 may include any one, or a combination of networks, such as a local area network (LAN), a wide area network (WAN), a telephone network, a cellular network, a cable network, a wireless network, and/or private/public networks, such as the Internet. For example, network 150 may support communication technologies, such as TCP/IP, Bluetooth, cellular, near-field communication (NFC), Wi-Fi, Wi-Fi direct, machine-to-machine communication, man-to-machine communication, and/or visible light communications.

Some or all portions of the wireless communication link that supports communications between predictive drawbridge operation platform 200 and a communication device, such as a router, for example, that may be included in network 150, may be implemented using various types of wireless technologies, such as Bluetooth®, ZigBee®, or near-field-communications (NFC), cellular, Wi-Fi, Wi-Fi direct, machine-to-machine communication, man-to-machine communication, and/or a vehicle-to-everything (V2X) communication.

Information shared between predictive drawbridge operation platform 200, cameras 110, AIS 120, online database 125, marine radio 130 and/or GPs system 140 may be stored on cloud storage 160 and may be bi-directional in nature. For example, in one case, predictive drawbridge operation information may be transferred from predictive drawbridge operation platform 200 to cloud storage 160. Such information stored on cloud storage 160 may be accessed and used by GPS system 140, e.g., various smart vehicles and/or smart mobile devices.

Figure 2:
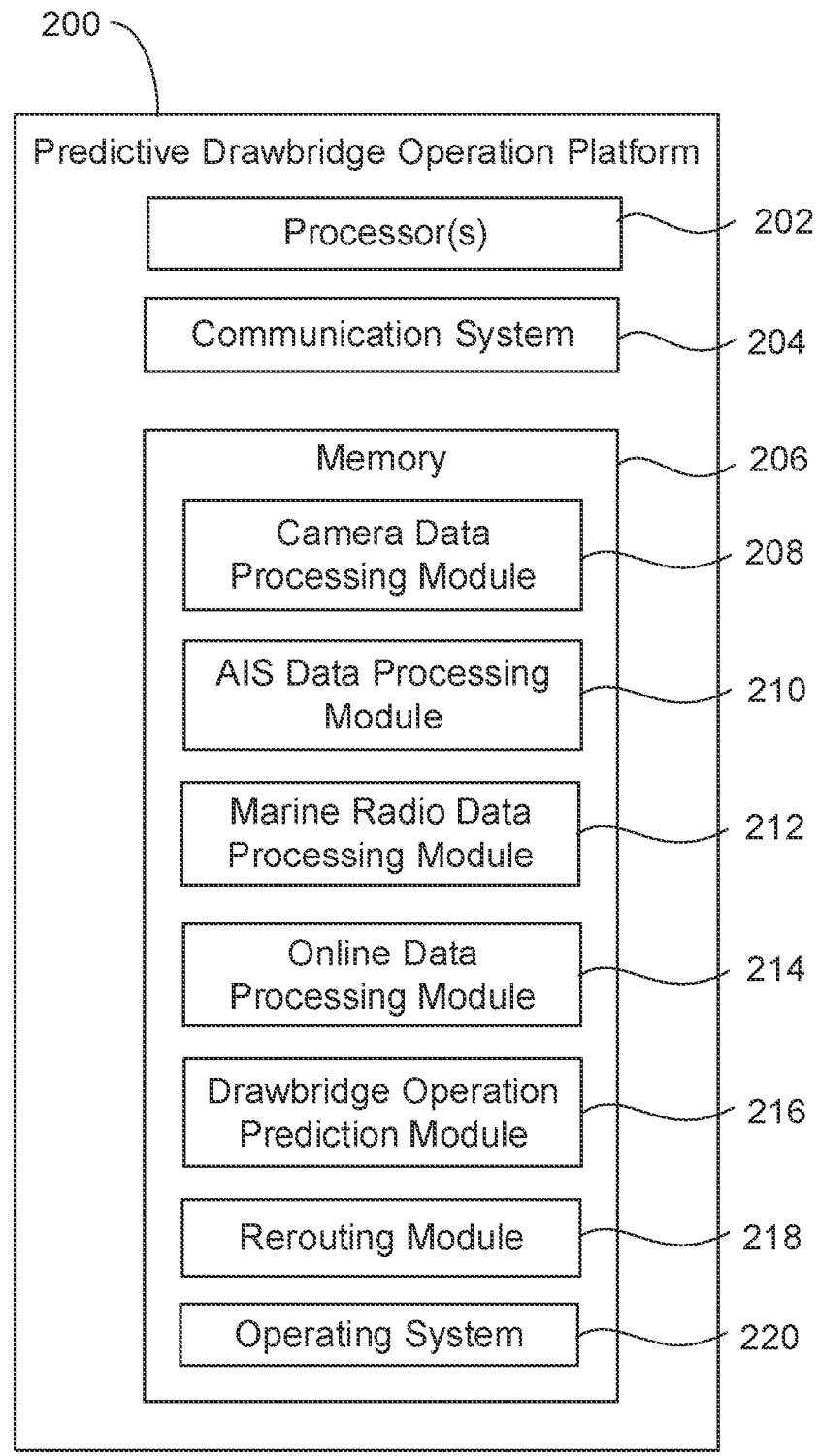
FIG. 2 shows some example components that may be included in a predictive drawbridge operation platform in accordance with the principles of the present invention.

Referring now to FIG. 2, components that may be included in predictive drawbridge operation platform 200 are described in further detail. Predictive drawbridge operation platform 200 may include one or more processors 202, communication system 204, and memory 206. Communication system 204 may include a wireless transceiver that allows predictive drawbridge operation platform 200 to communicate with cameras 110, AIS 120, online database 125, marine radio 130, GPs system 140, and cloud storage 160. The wireless transceiver may use any of various communication formats, such as, for example, an Internet communications format, or a cellular communications format.

Memory 206, which is one example of a non-transitory computer-readable medium, may be used to store operating system (OS) 220, camera data processing module 208, AIS data processing module 210, marine radio data processing module 212, online data processing module 214, drawbridge operation prediction module 216, and rerouting module 218. The modules are provided in the form of computer-executable instructions that may be executed by processor 202 for performing various operations in accordance with the disclosure.

Memory 206 may include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, memory 206 may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). The computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Camera data processing module 208 may be executed by processor 202 for receiving and processing vessel information data from cameras 110 and/or other sensing devices, e.g. LIDAR, RADAR, Infra-red etc. For example, from the image/video data received from cameras 110, camera data processing module 208 may derive vessel information such as incoming vessel size, incoming vessel type (commercial vessel or pleasure boat), incoming vessel speed, incoming vessel position, and/or incoming vessel quantity. AIS data processing module 210 may be executed by processor 202 for receiving and processing information received from AIS 120 such as a drawbridge operation schedule to identify incoming commercial boat traffic. Marine radio data processing module 212 may be executed by processor 202 for listening to marine radio 130, and for receiving and processing information received from marine radio 130 such as requests from an incoming vessel for the drawbridge to open, and additional vessel information provided by the vessel. Moreover, marine radio data processing module 212 may be executed by processor 202 for transcribing the audio data received from marine radio 130, such that the request and vessel information may be derived. For example, an incoming vessel may communicate to a drawbridge operator via marine radio 130 a request for the drawbridge to open in half an hour, and may provide additional information such as the size of the vessel. Accordingly, marine radio data processing module 212 may be executed by processor 202 to listen to marine radio 130, transcribe the audio data, and derive the information therefrom.

Online data processing module 214 may be executed by processor 202 for receiving and processing historical drawbridge operation information for a given vessel when prompted, e.g., in response to information received from any one of cameras 110, AIS 120, online database 125, or marine radio 130. For example, when predictive drawbridge operation platform 200 receives information regarding an incoming vessel, e.g., that the vessel is a large commercial vessel, online data processing module 214 may be executed by processor 202 to retrieve historical information regarding the large commercial vessel from online database 125 such as how long the drawbridge must remain open to permit the large commercial vessel to cross before the drawbridge may close again.

Drawbridge operation prediction module 216 may be executed by processor 202 for using machine learning to predict when a drawbridge will open for the incoming vessel to cross as well as the duration of the opening based on the information received by camera data processing module 208, AIS data processing module 210, marine radio data processing module 212, online data processing module 214 as described above. For example, based on information that an incoming vessel is a large commercial vessel and that there are three incoming large commercial vessels traveling as a known speed toward the drawbridge, that historical drawbridge operation data suggests that the drawbridge will need to remain open for twenty minutes for all three vessels to cross the drawbridge, and that there is no scheduled drawbridge opening at the time the three large vessels will arrive at the drawbridge, drawbridge operation prediction module 216 may generate predicted drawbridge operation data indicating that the drawbridge will be opened in half an hour for twenty minutes. In addition, the predicted drawbridge operation data may include uncertainty data, e.g., a numerical value indicative of the likelihood that the drawbridge will open as predicted by drawbridge operation prediction module 216. Such information also may be conveyed back to other vessels in the vicinity indicating wait times along with planned bridge opening times so that the other vessels may decide to cross the drawbridge now rather than having to wait longer to cross in the future.

The predicted drawbridge operation data may be communicated directly to GPS system 140 via network 150, such that GPS system 140 may revise its planned navigation route based on the predicted drawbridge operation data if GPS system 140 determines that the uncertainty data meets a predetermined threshold. For example, if the uncertainty data indicates that there's an 80% likelihood that the drawbridge operation prediction is accurate, and the predetermined threshold is 75%, then GPS system 140 will accept the prediction and revise its planned navigation route. Alternatively or additionally, predictive drawbridge operation platform 200 have its own predetermined uncertainty data threshold such that it only transmits the predicted drawbridge operation data if the uncertainty data exceeds the predetermined threshold, which may be less than the GPS system's predetermined threshold.

Alternatively, optional rerouting module 218 may be executed by processor 202 for generating a revised route, such that the revised route is communicated to GPS system 140 via network 150. The revised route may also include uncertainty data as described above. GPS system 140 may suggest the revised route to the user or accept the revised route if it determines that the revised route is more efficient for the planned navigation.

Figure 3:
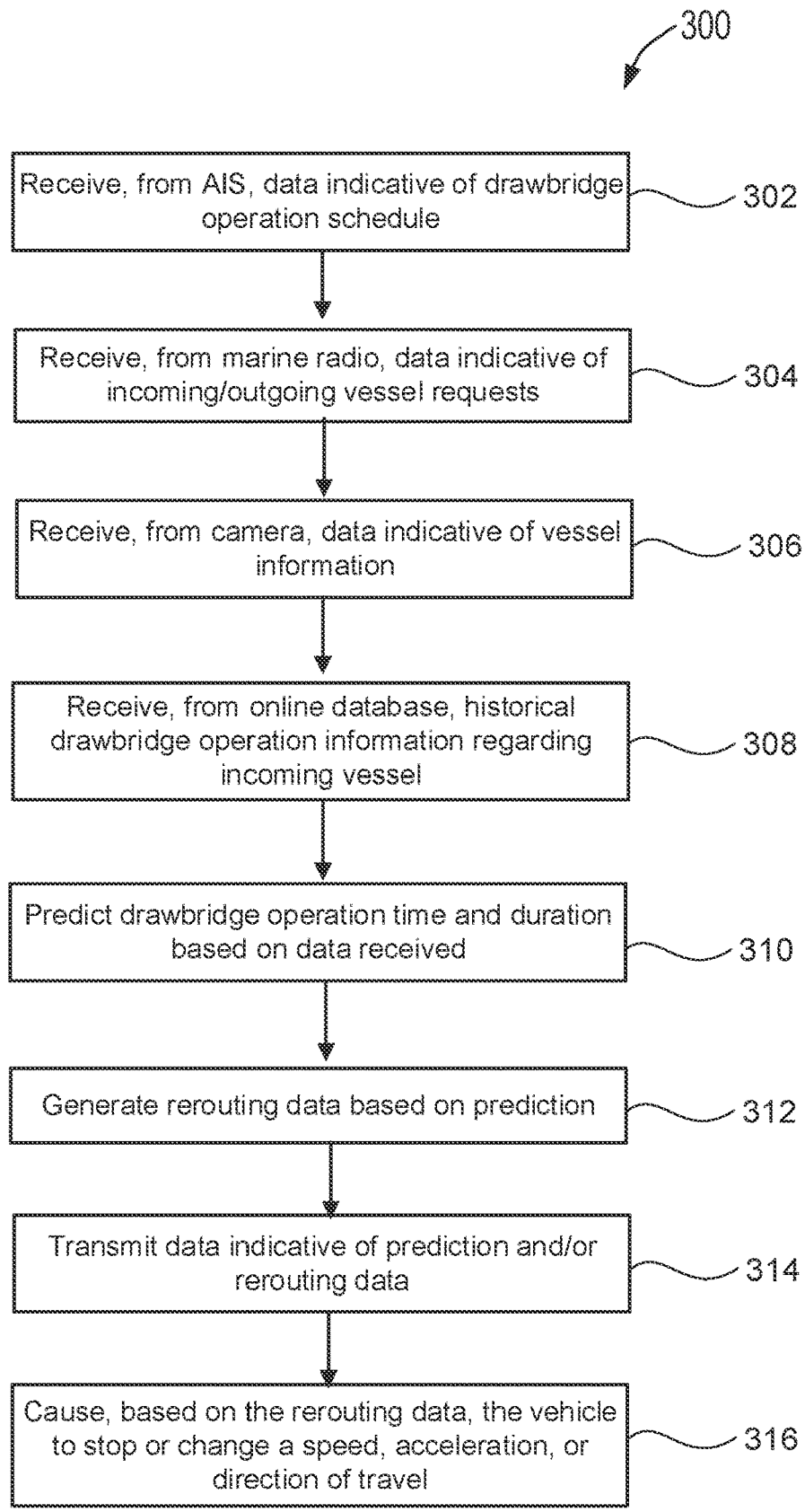
FIG. 3 is a flow chart illustrating exemplary steps for predicting drawbridge operation in accordance with the principles of the present invention.

Referring now to FIG. 3, exemplary method 300 for predicting drawbridge operation is described. At step 302, predictive drawbridge operation platform 200 may receive, from AIS 120, data indicative of drawbridge operation schedule for the day. As described above, commercial vessels generally request to cross a drawbridge ahead of time, such that a schedule may be available on AIS 120 for identifying when a commercial vessel is scheduled to cross the drawbridge. At step 304, predictive drawbridge operation platform 200 may receive, from marine radio 130, data indicative of a request by an incoming vessel communicated to the drawbridge operator for the drawbridge to open. The request could be made before the incoming vessel is visible to cameras 110.

At step 306, predictive drawbridge operation platform 200 may receive, from cameras 110, data indicative of incoming vessel information. For example, predictive drawbridge operation platform 200 may be alerted that a commercial vessel will be approaching the drawbridge via AIS 120 or that a pleasure boat will be approaching the drawbridge via marine radio 130, such that cameras 110 may be used to identify additional vessel information of the approaching commercial vessel or pleasure boat, such as vessel size, vessel quantity, etc.

At step 308, predictive drawbridge operation platform 200 may receive, from online database 125, historical drawbridge operation information for the incoming vessel identified in any of steps 302, 304, or 306. At step 310, predictive drawbridge operation platform 200 may predict when a drawbridge will open for the incoming vessel to cross as well as the duration of the opening based on the drawbridge operation schedule, incoming vessel information, and/or historical drawbridge operation information for the incoming vessel. In addition, predictive drawbridge operation platform 200 may determine an uncertainty level for the prediction.

At step 312, in one embodiment, predictive drawbridge operation platform 200 may generate routing data, e.g., initial routing or rerouting data, based on the predicted drawbridge operation generated at step 310. At step 314, if step 312 is not performed, predictive drawbridge operation platform 200 may transmit the predicted drawbridge operation information to GPS system 140, such that GPS system 140 may revise its planned navigation route based on the predicted drawbridge operation information as well as the uncertainty data. Alternatively, if step 312 is performed, predictive drawbridge operation platform 200 may transmit the routing data to GPS system 140. In one embodiment, GPS system 140 may calculate routing data based only on the trigger from platform 200. The transmission of prediction data at step 314 may occur locally to vehicles within a predetermined geofence perimeter around the drawbridge, which may be dependent on the communication range of the device. At step 316, system 100 may cause, based on the routing data, the vehicle to stop, change a speed, acceleration, or direction of travel, or otherwise alter the planned navigation route.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein may be performed in one or more of hardware, software, firmware, digital components, or analog components. For example, one or more application specific integrated circuits (ASICs) may be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. For example, the predictive drawbridge operation platform described herein may be disposed in or otherwise integrated with other components described herein such as the cameras, the cloud network, and/or the GPS system. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed:

1. A system for predicting drawbridge operation, the system comprising:
   a transceiver configured to receive data indicative of incoming vessel information;
   a memory that stores computer-executable instructions; and
   a processor configured to access the memory and execute the computer-executable instructions to:
   receive historical drawbridge operation data based on the incoming vessel information;
   predict drawbridge operation information based on the historical drawbridge operation data; and
   cause data indicative of the predicted drawbridge operation information to be transmitted to a GPS system, the GPS system configured to reroute a planned navigation route based on the predicted drawbridge operation information.

2. The system of claim 1, wherein the transceiver is configured to receive image data indicative of the incoming vessel information from one or more sensing devices disposed in a vicinity of a drawbridge and configured to capture and transmit image data indicative of the incoming vessel information, and wherein the processor is configured to extrapolate the incoming vessel information from the image data.

3. The system of claim 2, wherein the incoming vessel information comprises at least one of incoming vessel size, incoming vessel type, incoming vessel speed, incoming vessel heading, incoming vessel position, or incoming vessel quantity.

4. The system of claim 1, wherein the transceiver is configured to receive audio data indicative of the incoming vessel information from a marine radio, and wherein the processor is configured to transcribe the audio data to extrapolate the incoming vessel information from the audio data.

5. The system of claim 4, wherein the incoming vessel information comprises a request for drawbridge operation.

6. The system of claim 5, wherein the request for drawbridge operation comprises at least one of estimated incoming vessel arrival time, incoming vessel size, incoming vessel type, incoming vessel speed, incoming vessel position, or heading.

7. The system of claim 1, wherein the historical drawbridge operation data comprises at least one of average delay due to drawbridge operation, deviation from drawbridge operation schedule, or deviation from arrival and departure of vessel.

8. The system of claim 1, wherein the processor is configured to receive the historical drawbridge operation data based on the incoming vessel information from an online database.

9. The system of claim 1, wherein the processor is further configured to receive drawbridge operation schedule information from an Automatic Information System (AIS), and wherein the processor is configured to predict the drawbridge operation information based in part on the drawbridge operation schedule information.

10. The system of claim 1, wherein the GPS system is integrated in an autonomous vehicle or a mobile device application.

11. The system of claim 1, wherein the GPS system is within a predetermined geofence.

12. A method for predicting drawbridge operation, the method comprising:
    receiving, by a transceiver, data indicative of incoming vessel information;
    receiving, by a processor, historical drawbridge operation data based on the incoming vessel information;
    predicting, by the processor, drawbridge operation information based on the historical drawbridge operation data; and
    transmitting, by the transceiver, data indicative of the predicted drawbridge operation information to a GPS system, thereby causing the GPS system to route a planned navigation.

13. The method of claim 12, wherein receiving, by the transceiver, the data indicative of the incoming vessel information comprises receiving, by the transceiver, the data indicative of the incoming vessel information from one or more sensing devices, the method further comprising extrapolating, by the processor, the incoming vessel information from the data.

14. The method of claim 12, wherein receiving, by the transceiver, the data indicative of the incoming vessel information comprises receiving, by the transceiver, audio data indicative of the incoming vessel information from a marine radio, the method further comprising extrapolating, by the processor, the incoming vessel information from the audio data.

15. The method of claim 12, wherein receiving, by the processor, the historical drawbridge operation data based on the incoming vessel information comprises receiving, by the processor, the historical drawbridge operation data based on the incoming vessel information from an online database.

16. The method of claimer 12, wherein the GPS system is configured to route the planned navigation by causing a vehicle to stop, or change a speed, acceleration, or direction of travel.

17. A system for predicting drawbridge operation, the system comprising:
    a transceiver configured to receive data indicative of incoming vessel information;
    a memory that stores computer-executable instructions; and
    a processor configured to access the memory and execute the computer-executable instructions to:
    receive historical drawbridge operation data based on the incoming vessel information;
    predict drawbridge operation information based on the historical drawbridge operation data;
    generate one or more routing suggestions based on the predicted drawbridge operation information; and
    cause the one or more routing suggestions to be transmitted to a GPS system.

18. The system of claim 17, wherein the one or more routing suggestions comprises a suggested delayed departure time.

19. The system of claim 17, wherein the transceiver is configured to receive image data indicative of the incoming vessel information from one or more sensing devices disposed in a vicinity of a drawbridge and configured to capture and transmit image data indicative of the incoming vessel information, and wherein the processor is configured to extrapolate the incoming vessel information from the image data.

20. The system of claim 17, wherein the transceiver is configured to receive audio data indicative of the incoming vessel information from a marine radio, and wherein the processor is configured to transcribe the audio data to extrapolate the incoming vessel information from the audio data.

* * * * *